United States Patent [19]

Volk et al.

[11] Patent Number: 4,881,858
[45] Date of Patent: Nov. 21, 1989

[54] TOOL OFFSET INDICATOR

[75] Inventors: Karl G. Volk; William J. Delisle, both of San Jose, Calif.

[73] Assignee: Semprex Corporation, Campbell, Calif.

[21] Appl. No.: 25,969

[22] Filed: Mar. 16, 1987

[51] Int. Cl.⁴ ............................................. B23Q 15/22
[52] U.S. Cl. ..................................... 409/218; 33/638; 33/642; 340/680; 408/16
[58] Field of Search ...................... 408/6, 8, 11, 13, 16; 409/218; 33/628, 630, 638, 639, 640, 641, 642; 340/679, 680, 686

[56] References Cited

U.S. PATENT DOCUMENTS

| | | | |
|---|---|---|---|
| 3,481,247 | 12/1969 | Hayes | 33/642 |
| 3,552,027 | 1/1971 | Jacobsen | 33/642 |
| 3,636,814 | 1/1972 | Esch | 408/8 |
| 3,684,939 | 8/1972 | Perry | 33/628 |
| 4,204,782 | 5/1980 | Spits et al. | 408/8 |
| 4,326,824 | 4/1982 | Laserman et al. | 408/13 |
| 4,334,363 | 6/1982 | Stegemeyer et al. | 33/638 |
| 4,396,322 | 8/1983 | Nomura et al. | 408/8 |
| 4,425,061 | 1/1984 | Kindl et al. | 408/6 |
| 4,552,493 | 11/1985 | Schultzshick | 408/8 |
| 4,622,752 | 11/1986 | Harra | 33/628 |
| 4,826,370 | 5/1989 | Conradsson | 409/218 |

FOREIGN PATENT DOCUMENTS

| | | | |
|---|---|---|---|
| 27304 | 7/1972 | Japan | 340/680 |
| 31565 | 3/1980 | Japan | 408/6 |
| 160044 | 9/1983 | Japan | 408/8 |
| 774823 | 10/1980 | U.S.S.R. | 408/11 |

Primary Examiner—Joseph H. McGlynn
Assistant Examiner—Daniel W. Howell
Attorney, Agent, or Firm—Schroeder, Davis & Orliss Inc.

[57] ABSTRACT

A tool offset indicator for setting up cutting, milling and drilling operations in manually or programmable numerically controlled machines is provided. The tool offset indicator includes a block of insulating material interposed between electrically conductive top and bottom plates. An electric circuit providing power to an indicator is connected between the top and bottom plates such that when a tool cutting edge contacts either of the plates, the circuit is completed and the indicator device energized. One of the plates is compressively mounted to a surface of the block to prevent damage to the tool cutting edge if it over travels initial contact with the indicator surface.

13 Claims, 3 Drawing Sheets

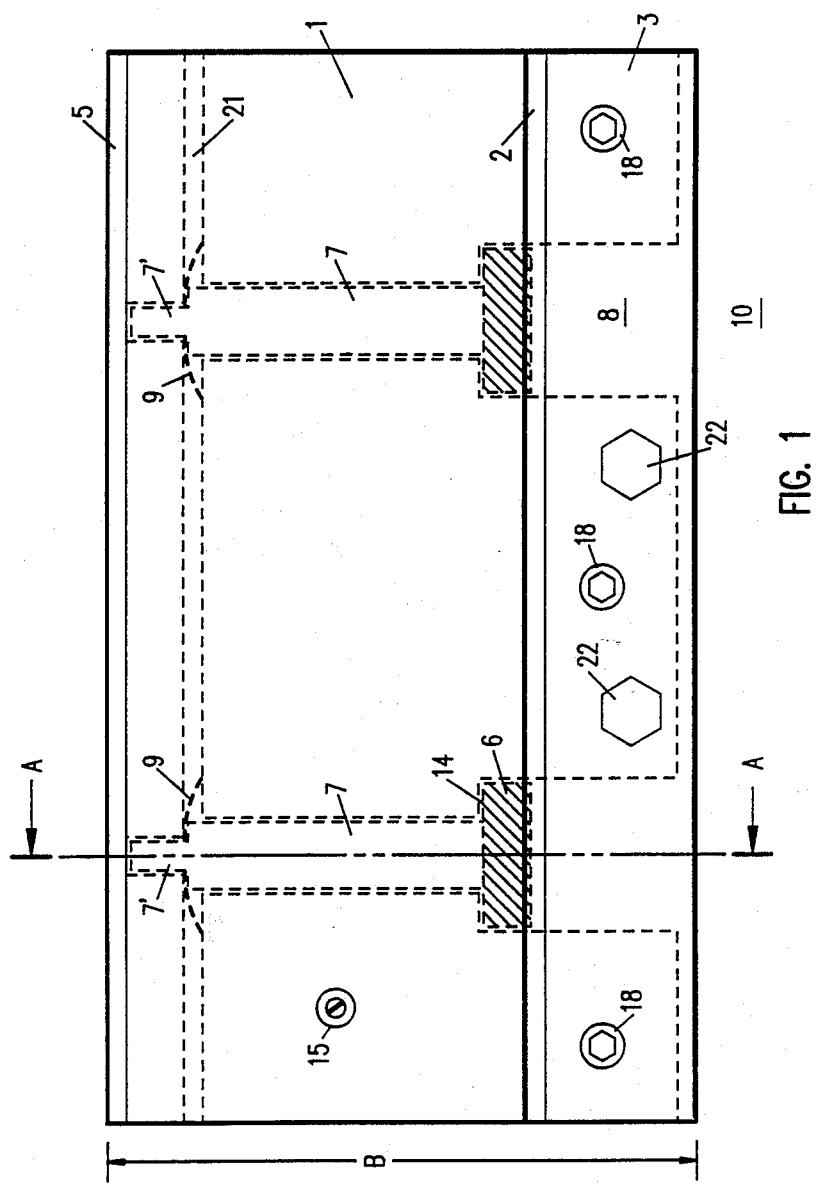

TOOL OFFSET INDICATOR

BACKGROUND OF THE INVENTION

The present invention relates generally to machine tools and accessories for use in precision machining operations and, more particularly, to axial and radial tool offset indicators for use in setting up manually or numerically controlled metal cutting machinery.

In present day machining operations using numerical or computer controlled machines, it is necessary to very precisely determine the location of a tool tip or cutting edge with respect to machine coordinates or the surface of a workpiece. By so precisely locating the tool tip or cutting edge, the machines may be programmed to perform extremely accurate cutting, milling and drilling operations.

Tool tip or workpiece locating is performed during the initial setup of the machine or whenever a dull or broken tool must be replaced during operation. To determine the correct offset of a tool tip with respect to the machine coordinates, the workpiece, or a reference indicating device, is approached to just touch the surface thereof and record the tool tip or cutting edge location relative to a reference surface as indicated by the machine readout. Thereafter the machine may be programmed for a complete machining operation taking into account the precise tool offset.

If the tool is already mounted in the holder, the cutting tool or workpiece edge may be damaged during setup if it is inadvertantly driven into the surface of the workpiece or other reference surface. In addition, if the workpiece is already mounted, its surface may be scarred, or if the material of the workpiece is soft enough, the accuracy of the readout of the location of the tool holder may be compromised.

SUMMARY OF THE INVENTION

The present invention provides a tool offset indicator, simple in design and construction which accurately locates the starting point for all types of machine work. The present invention provides a tool offset indicator that does not damage a tool tip or a cutting edge of a milling cutter when the tool is inadvertently driven past its initial contact with the indicator during setup of a machine. It eliminates the operator's dependency on feel during machine setup by illuminating a light at the instant of initial contact of the tool with the indicator.

A tool offset indicator constructed according to the principles of the present invention provides a compressible gage block which compresses slightly under pressure thereby not breaking or damaging a tool tip or cutting edge when the tool is inadvertently advanced past the initial contact point with the offset indicator. The offset indicator comprises a precisely dimensioned block of suitable insulating material such as glass fiber reinforced plastic having an electrically conductive movable top plate and bottom plate assembly. The plates may extend over the entire top and bottom surfaces of the block, or may be mounted in less extensive recesses formed in those surfaces. In either configuration, the plates are electrically insulated from one another and may be magnetized for convenient mounting.

The depth of the recesses is slightly less than the thickness of the top and bottom plates such that the top and bottom plates protrude slightly from the block when the plates are mounted in the recesses. The top plate is movably mounted in the top recess. The bottom plate assembly is rigidly mounted in the bottom recesses and secured by bolts which are anchored in the plastic block.

Compressible elements, such as spring washers, separate the movable top plate from the block surface within the top recess to provide for a small amount of inward movement of the top plate when sufficient force is applied. Thus, if the tool tip or cutting edge overtravels the initial point of contact with the offset indicator of the present invention, it is cushioned by such movement and damage to the tool is prevented. The tool offset indicator of the present invention includes a light and/or sound source and a power source to provide an audio/visual indication when a tool tip or cutting edge of a milling cutter contacts the offset indicator.

BRIEF DESCRIPTION OF THE DRAWINGS

FIG. 1 is a plan view from one side illustrating a tool offset indicator according to the principles of the present invention;

DETAILED DESCRIPTION OF THE PREFERRED EMBODIMENT

Figure 4:
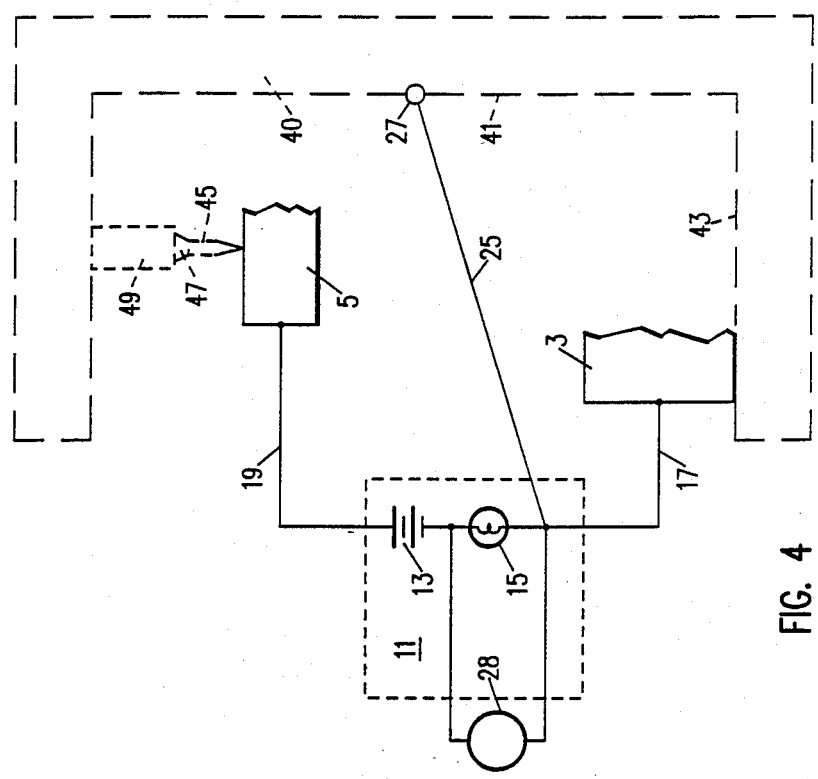
FIG. 4 is a schematic diagram of the indicator circuit of the tool offset indicator of FIG. 1.
Figure 2:
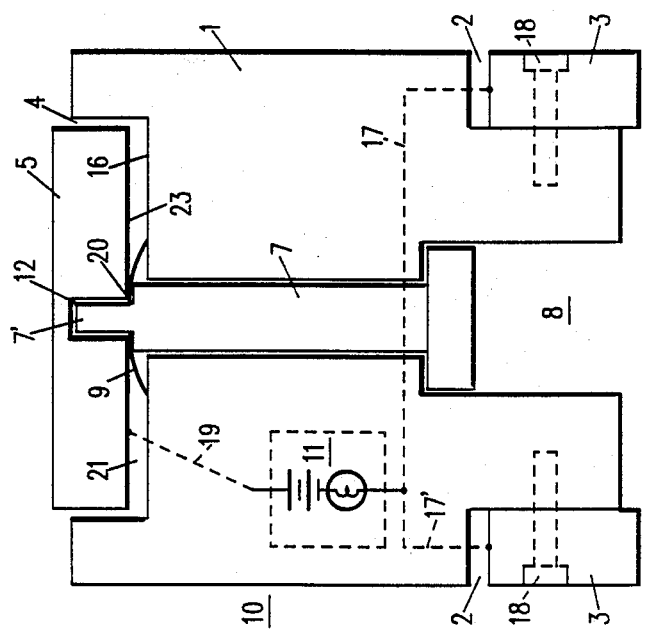
FIG. 2 is an end view taken along the plane A—A of the tool offset indicator shown in FIG. 1.

Referring now to FIGS. 1 and 2, an illustrative embodiment of a tool offset indicator according to the principles of the present invention is shown. The tool offset indicator 10 is comprised of a rectangular-shaped block 1 of glass fiber reinforced plastic or other suitable material, a movable top plate 5, a bottom plate assembly 3, retainer bolts 7, spring washers 9 and magnets 22. Indicator circuit 11 comprising lamp 15 and/or speaker 28 and power source 13 (as shown in FIG. 4) is potted in one end of the plastic block 1. Circuit 11 is coupled to the movable plate 5 and bottom plate assembly 3 by conductors 19 and 17, 17', respectively (as shown in FIG. 4). Movable plate 5 and bottom plate assembly 3 are positioned in shallow rectangular recesses 4, 2, respectively, formed in two opposing surfaces (the top and bottom or side surfaces) of the plastic block 1. Bottom plate assembly 3 comprises two elongated rectangular plates 3 rigidly mounted in recesses 2 by bolts 18. The movable plate 5 is compressibly mounted and retained in spaced-apart position in recess 4 by bolts 7 anchored in bores 8'. Spring washers 9 disposed between the movable plate 5 and the surface 16 of recess 4 urge movable plate 5 outwardly to maintain the movable plate 5 in spaced-apart relationship with the surface 16 forming gap 21. The depth of recesses 2 and 4 is slightly less than the thickness of plates 3 and the movable plate 5 ensuring that plates 3 and movable plate 5 protrude slightly from the surfaces of block 1 as shown in FIG. 1.

Figure 3:
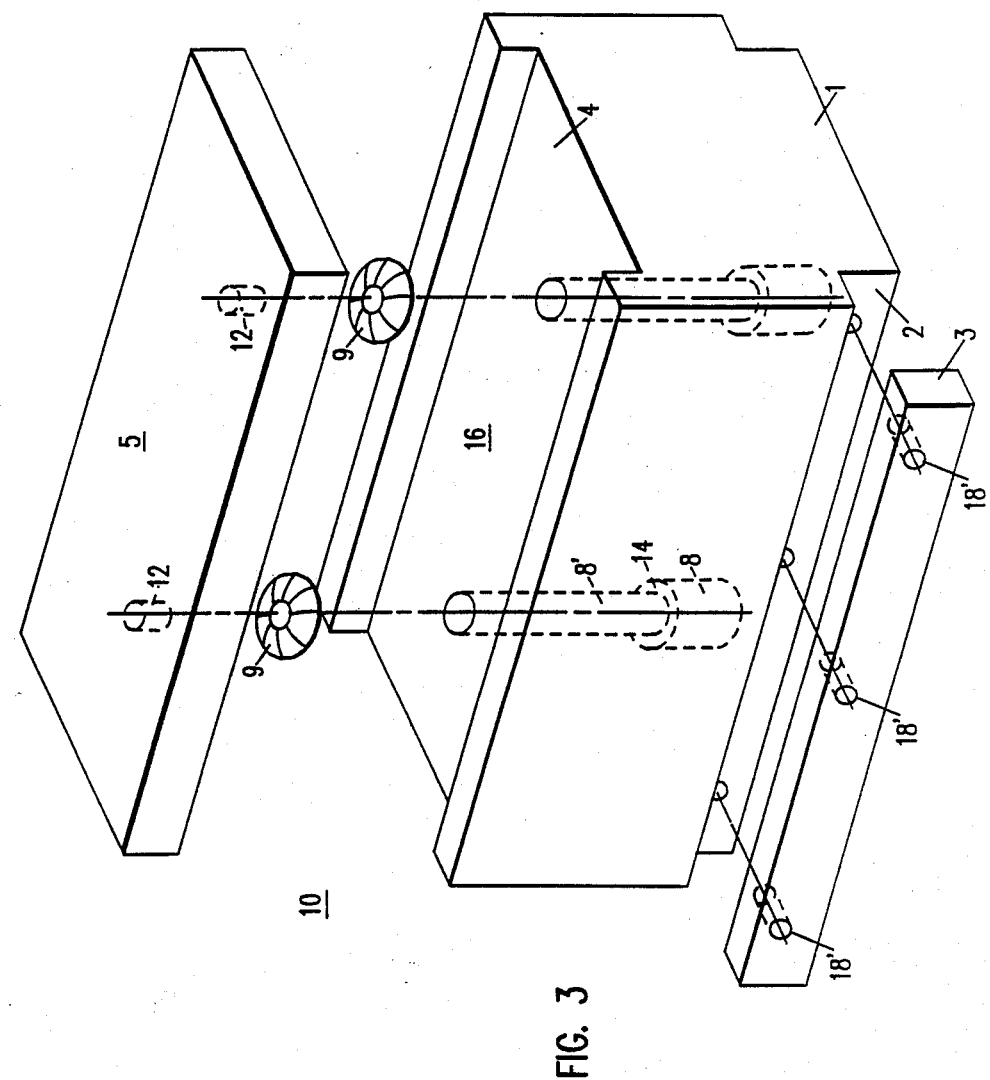
FIG. 3 is an exploded view in perspective illustrating the details of construction of the tool offset indicator shown in FIGS. 1 and 2.

Referring now also to FIG. 3, bore 8' extends through plastic block 1 to surface 16 in recess 4. Counterbore 8 extends into the plastic block 1 from the surface opposite surface 16 forming shoulder 14. The movable plate 5 has two threaded holes 12 for receiving threaded bolt tip 7'. To assemble the offset indicator 10, bolts 7 are inserted into bore 8', through spring washers 9, into threaded holes 12 in movable plate 5. As bolt 7 is tightened in threaded hole 12, bolt 7 is drawn into counterbore 8 until the shoulder formed by bolt head 6 abuts shoulder 14. Continued tightening of bolt 7 compresses spring washers 9 until shoulder 20 of bolt 7 abuts the inner surface 23 of movable plate 5. Movable plate 5 is now rigidly retained in place by spring washer 9 holding bolt 7 against shoulder 14.

Block 1 is constructed of a rugged, highly rigid material which is also electrically insulating to enable potting the circuit 11 in one end of block 1. Block 1 may be milled or molded from glass fiber reinforced plastic or other suitable material. The movable plate 5 and bottom plate assembly 3 are machined from an electrically conductive material such as case hardened or tool steel.

Referring to FIG. 4, a second conducter 25 having magnetic clip 27 is provided to electrically couple the bottom plate 3 to a machine frame 41 (such as a computer controlled milling machine indicated generally by dashed outline 40) to ensure that a complete electric circuit exists when a tool tip contacts one of the conductive plates 3, 5 regardless of the material that the offset indicator 10 is positioned on.

The offset indicator 10 is positioned on a worktable 43 with the bottom plate assembly 3 facing down and in contact with the worktable 43. The tool 45, such as a milling cutter, is held in a tool holder 47 mounted in a spindle 49. The tool 45 is lowered until the tool tip or cutting edge makes contact with the movable plate 5. When the tool tip or cutting edge makes contact with the movable plate 5, the normally open electrical circuit is completed (through the electrically conductive metal frame of the machine 40) and the lamp 15 lights providing visual indication that the tool tip or cutting edge has contacted the movable plate 5. Also or alternatively speaker 28 emits sound to provide an audio indication of tool tip or cutting edge contact.

Because the offset indicator 10 components have been manufactured to precise dimensions, the position of the tool tip or cutting edge with respect to a reference surface or the machine coordinate system is now accurately located. If dimension B (as shown in FIG. 1) of the offset indicator 10 is precisely known, then the position of the tool tip or cutting edge with respect to the workpiece is also accurately known.

Because the movable plate 5 is retained in spaced-apart position by the action of the spring washers 9, if the tool tip or cutting edge overtravels the initial contact with the movable plate 5, the spring washers will be further compressed preventing damage to the tool tip or cutting edge. The force required to depress the movable plate 5 must be sufficient to assure positive contact, yet not so much that the resulting strain will damage the tool tip or cutting edge. Therefore the spring constant of the spring washers 9 must be chosen to ensure positive contact without damage to the tool tip or cutting edge.

Spring washer 9 may be a bellville or wavy spring washer or otherwise made of any elastic material, even foam rubber. Also, as stated elsewhere in this specification, recesses 2 and 4 are not required. Plates 3 and 5 may extend over the entire area of the opposing surfaces of the block. Of course, one of the plates must be compressibly mounted as described for the mounting of movable plate 5. Lamp 15 can be any light source including a light emitting diode (LED). Finally, speaker 28 can be any sound emitting device such as a piezoelectric buzzer.

The tool offset indicator of the present invention may be mounted so that the tool holder or tool tip may approach the plates of the offset indicator 10 horizontally to accommodate the tool holder configuration of many numerical controlled machines. The tool offset indicator of the present invention may be used to determine the radial and axial dimensions of the tool cutting edges. Although described as a movable top plate and bottom plates, it should be understood that plates 3 and 5 may be oriented in any other plane as well.

While we have shown and described the preferred embodiment of our invention, we wish it to be understood that the invention is not confined to the precise details of construction herein set forth by way of illustration, as it is apparent that many changes and variations may be made therein, by those skilled in the art, without departing from the spirit of the invention or exceeding the scope of the appended claims.

We claim:

1. A tool offset indicator comprising: a rigid, generally rectangular block having predetermined dimensions, said block having first and second opposing flat surfaces;
a rigid, generally flat electrically conductive movable plate;
first means for compressibly mounting said movable plate to said first flat surface;
a rigid, generally flat electrically conductive plate assembly;
second means for rigidly mounting said plate assembly to said second flat surface; and
indicator means coupled to said movable plate and to said rigidly mounted plate assembly for providing an indication when a tool cutting edge contacts either said movable plate or said rigidly mounted plate assembly, said tool cutting edge completing an electrical circuit providing power to said indicator means when said tool cutting edge contacts either said movable plate or said rigidly mounted plate assembly.

2. A tool offset indicator as in claim 1 wherein:
said first surface includes a first recess formed in said block;
said second surface includes a second recess formed in said block;
said movable plate compressibly mounted in said first recess; and
said plate assembly rigidly mounted in said second recess.

3. A tool offset indicator as in claim 2 wherein said movable plate protrudes from said first recess a predeterminded amount beyond said first surface and said plate assembly protrudes from said second recess a predetermined amount beyond said second surface.

4. A tool offset indicator as in claim 3 wherein said first recess is defined by an inner surface and perpendicular walls, said inner surface parallel to said first surface, said movable plate compressibly mounted on said inner surface.

5. A tool offset indicator as in claim 4 wherein said first means comprises at least one compressible element disposed between said inner surface and said movable plate.

6. A tool offset indicator as in claim 5 wherein said compressible element comprises spring means disposed between said inner surface and said movable plate, said spring means for urging said movable plate outwardly and maintaining said movable plate in spaced-apart relationship with said inner surface.

7. A tool offset indicator as in claim 6 wherein said indicator means comprises:
   a light source coupled to one of said movable plate and said plate assembly; and
   an electric power supply coupled to said light source and to the other one of said movable plate and said plate assembly.

8. A tool offset indicator as in claim 7 wherein said electric power supply comprises a dry cell.

9. A tool offset indicator as in claim 7 wherein said light source comprises an electric lamp.

10. A tool offset indicator as in claim 7 wherein said light source comprises a light emitting diode.

11. A tool offset indicator as in claim 7 wherein said indicator means further includes electric conductor means for electrically coupling one of said movable plate and said plate assembly to a machine frame.

12. A tool offset indicator as in claim 7 wherein said indicator means further includes a sound emitting means coupled to one of said movable plate and said plate assembly and to said electric power supply.

13. A tool offset indicator as in claim 6 wherein said indicator means comprises:
   sound emitting means coupled to one of said movable plate and said plate assembly; and
   an electric power supply coupled to said sound emitting means and to the other one of said movable plate and said plate assembly.

* * * * *